United States Patent [19]

Hall, II et al.

[11] Patent Number: 5,450,240
[45] Date of Patent: Sep. 12, 1995

[54] DEVICE AND METHOD FOR LIGHT BEAM SPLITTING FOR DUAL SENSOR FLAME DETECTOR

[75] Inventors: George R. Hall, II, Geneva; Taryl W. Vertal, Willoughby, both of Ohio

[73] Assignee: Elsag International N.V., Amsterdam, Netherlands

[21] Appl. No.: 95,699

[22] Filed: Jul. 22, 1993

[51] Int. Cl.6 .......................................... G02B 21/00
[52] U.S. Cl. ..................................... 359/613; 359/634
[58] Field of Search .................... 359/636, 894, 613

[56] References Cited

U.S. PATENT DOCUMENTS

| | | | |
|---|---|---|---|
| 1,253,138 | 1/1918 | Brewster | 359/636 |
| 2,043,292 | 6/1936 | Hillman | 359/636 |
| 4,654,530 | 3/1987 | Dybwad | 250/347 |
| 5,039,203 | 8/1991 | Wishikuwa | 359/894 |
| 5,067,805 | 11/1991 | Corle et al. | 359/638 |

Primary Examiner—Georgia Y. Epps
Assistant Examiner—Thomas Robbins
Attorney, Agent, or Firm—Michael M. Rickin

[57] ABSTRACT

A beam splitter for transmitting and deflecting light comprises a foil having a top surface and at least one hole therethrough. A highly reflective finish is provided on the top surface of the foil. Light is transmitted through the holes in the foil while other light is reflected from the reflective finish on the top surface.

18 Claims, 1 Drawing Sheet

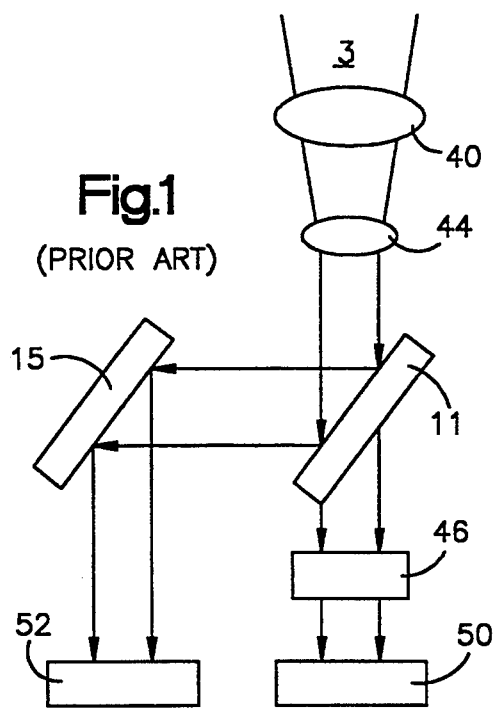
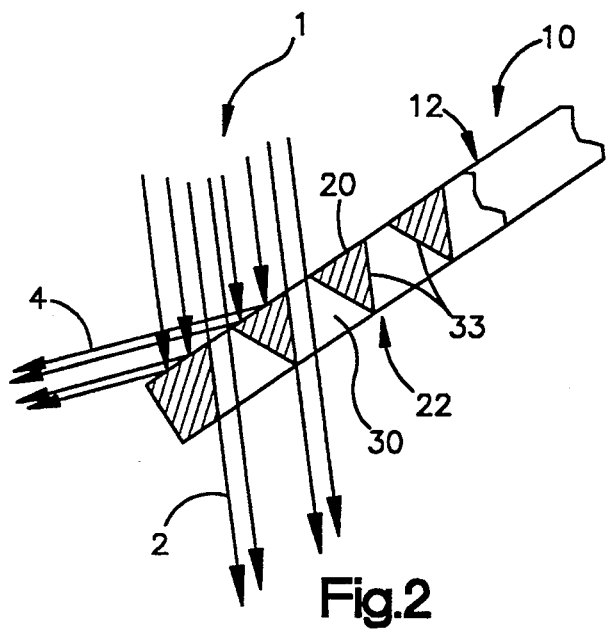
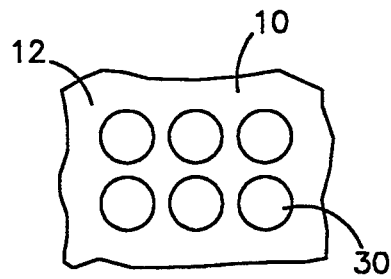
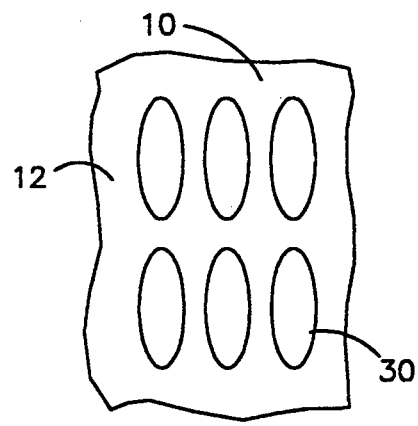
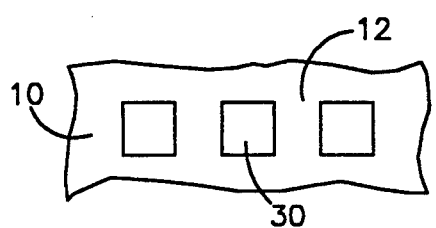
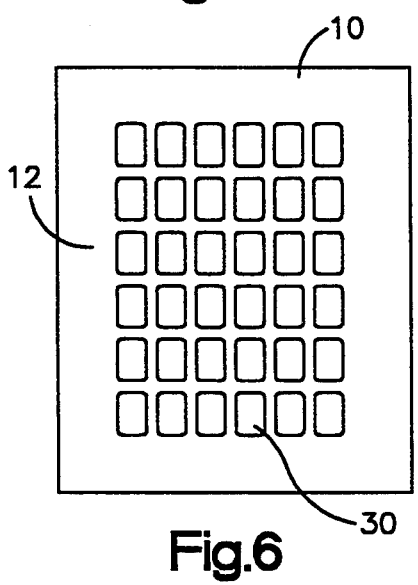

DEVICE AND METHOD FOR LIGHT BEAM SPLITTING FOR DUAL SENSOR FLAME DETECTOR

FIELD AND BACKGROUND OF THE INVENTION

The present invention relates in general to the splitting of light beams and in particular to a new and useful device and method for splitting light beams through the use of a thin foil.

In the optics field, it is common to use a beam splitter which is made up of a glass or quartz, for splitting or dividing light beams. Usually, the known i.e. glass or quartz, beam splitter is mounted at some angle to the path of the light beam. A top surface of the beam splitter is then coated with a fragile coating. It is the optical properties of the coating which allows a portion of the light to be transmitted through the beam splitter while reflecting a uniform portion of the light from the top surface.

In these known devices, the beam splitting is controlled by controlling the coating on the top surface of the beam splitter. Thus, a reflection to transmission ratio, such as 50/50 or 70/30, can be achieved by varying the coating.

However, the known beam splitters do not split light wavelengths in the ultraviolet region in the same proportion as they split light wavelengths in the infrared region. When a known beam splitter is used, for example, in a detector for detecting flame in a boiler, this disparate splitting of the light wavelengths of the flame may cause a problem as the flame detector must detect a broad range of light wavelengths.

Because of the composition of these known beam splitters, i.e. quartz or glass, the production, manufacture and sale of the beam splitter prove to be very costly. In particular, the application of the coatings and the finishing of the surface to produce an efficient interface are both time consuming. In addition, the coatings used for these known beam splitters is also very expensive and fragile.

Additionally, another problem associated with known beam splitters is that some of the light is absorbed by the materials, thus reducing the total light transmitted through the beam splitter.

SUMMARY OF THE INVENTION

The present invention pertains to a device and method for splitting light beams which comprises a foil having a top surface and having at least one hole therethrough. A highly reflective finish is provided on the top surface of the foil for deflecting the light beam.

The present invention provides a beam splitter which is inexpensive compared to the known beam splitters.

The present invention comprises a thin foil which has a thickness less than 0.003 inches and has a plurality of holes arranged in a pattern through the foil. The top surface of the foil has a highly reflective finish provided by electropolish. The present invention provides for an efficient beam splitter by allowing light beams to pass through the holes in the foil while having other light beams reflected from the highly reflective finish on the top surface of the foil.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a schematic view of a system using a known beam splitter.

FIG. 2 is a beam splitter embodied in accordance with the present invention.

FIG. 3 is a view illustrating a section of the beam splitter of FIG. 2.

FIG. 4 is a view illustrating a second embodiment of FIG. 3.

FIG. 5 is a view illustrating a third embodiment of FIG. 3.

FIG. 6 is a view illustrating a fourth embodiment of FIG. 3.

DESCRIPTION OF THE PREFERRED EMBODIMENTS

FIG. 1 illustrates a known system using a known beam splitter 11 which usually comprises quartz or glass. In this system, a light beam field 3 is provided through a collecting lens 40 which transmits the light beams to a focusing lens 44.

Light from the focusing lens 44 is transmitted to the beam splitter 11 which splits the light beams. Light beams transmitted through the beam splitter 11 are transmitted to a visible light filter 46. Those beams which are reflected from the beam splitter 11 are reflected to a mirror 15. As shown in FIG. 1., the beam splitter 11 is usually mounted at a 45° angle with the light beam path.

The visible light filter 46 filters the transmitted light from the beam splitter 11 to a first sensor 50. The light beams reflected by the beam splitter 11 to the mirror 15 are in turn reflected from the mirror 15 to a second sensor 52. The system shown in FIG. 1 may be a detector for detecting flame in a boiler. In that instance the first sensor 50 will be an ultraviolet sensor and the second sensor 52 will be a flicker sensor.

According to the present invention, FIG. 2 shows a beam splitter 10 comprising a thin foil or thin metal which is 0.003 inches (0.0762 mm) thick or less. The beam splitter 10 is made of any suitable corrosion resistant material such as austenitic stainless steel or ELGILOY ® steel.

Similar to the known devices, the beam splitter 10 can be mounted at a 45° angle to a light path 1. The beam splitter 10 has a plurality of overcut holes 30, which are etched through the beam splitter 10. The overcut holes 30 are etched through the beam splitter 10 by etching from the rear side 22 of the beam splitter 10 to the front side 12 of the beam splitter 10. The etched overcuts 30 in the beam splitter 10 have overcut angles 33. The overcut holes may also be electro-etched depending on the type of material that the beam splitter is made of. As electro-etching is a form of etching the term "etch" will be used hereinafter to refer to either etching or electro-etching.

The front side 12 of the beam splitter 10 has a highly reflective finish 20 which is an electropolish finish.

When the beam splitter 10 is placed in the light path 1, transmitted light 2 is passed through the beam splitter 10 through the etched overcuts 30. The electropolish finish 20 on the top surface 12 of the beam splitter 10 deflects reflected light 4 from the beam splitter 10. Because the holes 30 are etched from the rear side 22 of the beam splitter 10, the resulting overcut angles 33 of the overcuts 30 substantially prevents the scattering of transmitted light as it passes through the overcut holes.

FIG. 6 shows the beam splitter 10 having a plurality of overcuts 30 which are rectangular-shaped and arranged in a pattern in the beam splitter 10. The overcut holes 30 are preferably arranged in a pattern of 36 holes.

FIG. 5 illustrates the holes 30 as square-shaped for transmitting light. It is preferable for the overcut holes 30 to be either rectangular-shaped or square-shaped according to the present invention. However, the holes 30 can be circular-shaped, as shown in FIG. 3, or elliptical-shaped as shown in FIG. 4 or any other suitable shape.

The present invention provides a beam splitter 10 which is relatively inexpensive compared to the known beam splitters 11 which are usually made of quartz. It is not uncommon for a known beam splitter 11 to cost as much as 15 to 20 times the amount of the cost of the beam splitter 10 according to the present invention.

The present invention allows for a zero loss of a transmitted light unlike the known beam splitters which absorb some of the wave lengths of the light. The zero loss of light provided by the present invention is due to secondary reflective surfaces. There is also no light beam offset caused by the transmitted light in the present invention.

The present invention is also insensitive to mechanical and thermal shock unlike the fragile reflective coatings used in the known devices. Additionally, the present invention avoids using fragile and expensive coatings which are normally found with known devices.

The beam splitter according to the present invention is preferably made of a foil or metal; however, it can be made of plastic or other suitable material capable of supporting an electropolish finish.

While a specific embodiment of the invention has been shown and described in detail to illustrate the application of the principles of the invention, it will be understood that the invention may be embodied otherwise without departing from such principles.

What is claimed is:

1. A beam splitter for transmitting and deflecting light comprising:

a foil having a top surface and having only a plurality of identical overcut holes completely therethrough; and a highly reflective finish on the top surface of the foil.

2. The beam splitter according to claim 1, wherein the highly reflective finish comprises an electropolish finish.

3. The beam splitter according to claim 2, wherein the foil comprises an austenitic stainless steel.

4. The beam splitter according to claim 2, wherein the foil comprises an ELGILOY ® steel.

5. The beam splitter according to claim 2, wherein the foil has a thickness less than 0.003 inches.

6. The beamsplitter according to claim 1, wherein said plurality of identical overcut holes are arranged in a pattern.

7. The beam splitter according to claim 6, wherein the holes are evenly distributed about the foil.

8. The beam splitter according to claim 6, wherein the holes are formed by etching overcuts in a rear surface of the foil and through the foil at the top surface.

9. The beam splitter according to claim 8, wherein the holes are angled from the rear surface to the top surface of the foil.

10. The beam splitter according to claim 6, wherein the holes are rectangular-shaped.

11. The beam splitter according to claim 6, wherein the holes are square-shaped.

12. The beam splitter according to claim 6, wherein the holes are circular-shaped.

13. The beam splitter according to claim 6, wherein the holes are elliptical-shaped.

14. The beam splitter according to claim 6, wherein the pattern comprises 36 holes.

15. A method of making a beam splitter, the method comprising the steps of:

providing a foil;

etching only a plurality of identical overcut holes completely through the foil; and providing a highly reflective finish on a top surface of the foil.

16. The method according to claim 15, wherein the finish comprises an electropolish finish.

17. The method according to claim 15, wherein said plurality of holes are etched through the foil in a pattern.

18. The method according to claim 17, wherein the holes are formed by etching overcuts in a rear surface of the foil.

* * * * *